Nov. 7, 1950  J. F. WALKER  2,529,269
PARAFORMALDEHYDE FROM FORMALDEHYDE-CONTAINING GAS
Filed June 18, 1948
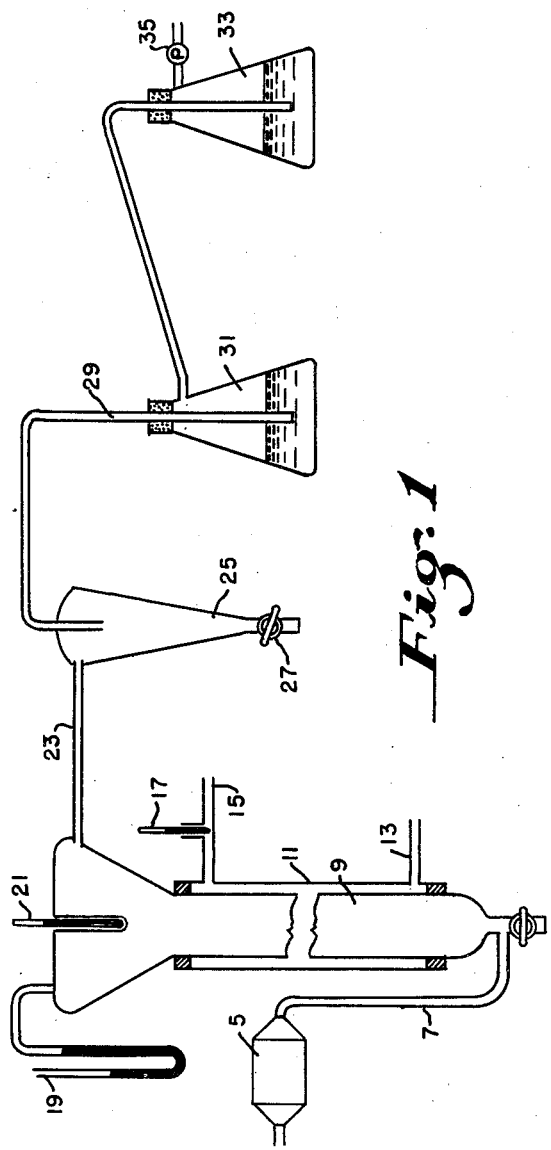
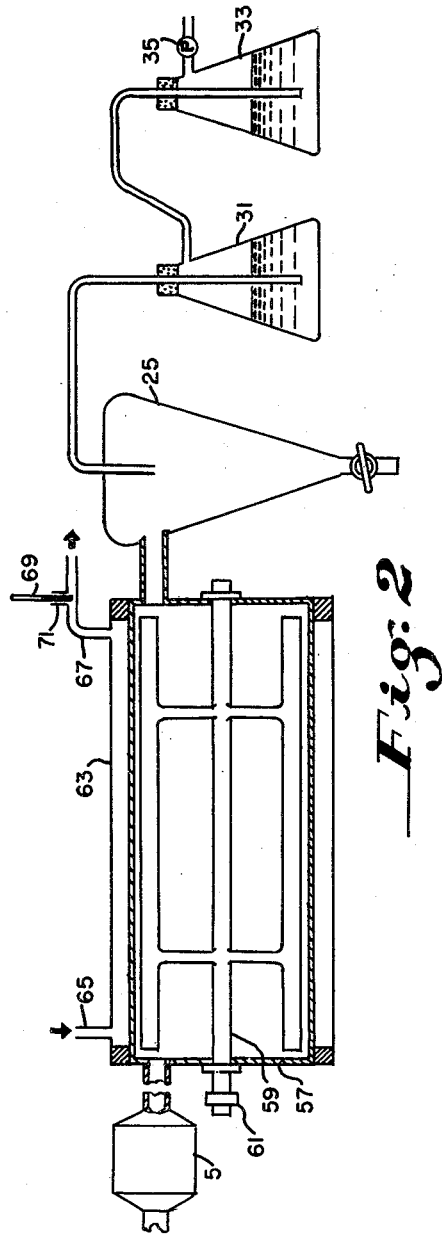
INVENTOR.
Joseph Frederic Walker
BY Patented Nov. 7, 1950

2,529,269

UNITED STATES PATENT OFFICE 2,529,269

PARAFORMALDEHYDE FROM FORMALDEHYDE-CONTAINING GAS

Joseph Frederic Walker, Westfield, N. J., assignor to E. I. du Pont de Nemours & Company, Wilmington, Del., a corporation of Delaware.

Application June 18, 1948, Serial No. 33,872

2 Claims. (Cl. 260—340)

This invention relates to the production of formaldehyde products, and more particularly it relates to the direct production of paraformaldehyde from formaldehyde-containing gases.

Prior to the present invention, paraformaldehyde was produced by first absorbing formaldehyde gas in water to form an aqueous formaldehyde solution and then concentrating said solution by evaporation or distillation until paraformaldehyde was obtained.

It is an object of this invention to produce paraformaldehyde directly from formaldehyde-containing gas.

It is another object of this invention to produce paraformaldehyde directly from formaldehyde-containing gas with the simultaneous production of an aqueous solution of formaldehyde.

Other objects of the invention will appear hereinafter.

The objects of this invention may be accomplished, in general, by passing formaldehyde-containing gas, i. e., gas containing about 3% or more by volume of formaldehyde into contact with paraformaldehyde particles at a temperature between the dew-point of the gas and 100° C.

In accordance with the preferred method of carrying out the present invention, the formaldehyde-containing gas, at a temperature of between 50° C. and 100° C., is passed into a mass of moving particles of paraformaldehyde maintained at a temperature above the dew-point temperature of the gas but below the temperature at which the partial pressure of the formaldehyde in the gas is equal to the decomposition pressure of paraformaldehyde.

The procedural details of the process of the present invention will be more clearly apparent by reference to the accompanying drawings of two embodiments of apparatus suitable for use in carrying out the process of the present invention.

In the drawings:

Fig. 1 is a diagrammatic side elevational view of a device employing fluidized particles of paraformaldehyde for the formation of paraformaldehyde from converter gas.

Fig. 2 is a diagrammatic side elevational view of a device adapted for the agitation of paraformaldehyde particles through which the converter gas is passed.

Referring to Fig. 1 of the drawings, reference numeral 5 designates, diagrammatically, a converter in which the mixture of air and methanol gases are catalytically converted to a formaldehyde-containing converter gas. The converter gas passes from converter 5 through conduit 7 into the bottom of a particle fluidizing tube 9. Cooling means, not shown, may be provided in conduit 7 between the converter and the tube 9. Particles of paraformaldehyde are placed in tube 9 and by passing formaldehyde-containing gas from the bottom upwardly therethrough the particles are brought into a fluid mass resembling a boiling liquid. The tube 9 may have any desired length. The fluidization of particles without causing channelling or undesirable blowing of the particles is, per se, well known in the art. For relationship of particle sizes of the material to be fluidized, the velocity of the fluidizing gas, the depth of particles in the fluidizing chamber, etc., to obtain a fluidized mass of granular particles, reference is made to U. S. Reissue Patent No. 21,526. The tube 9 is surrounded by means of a jacket 11 through which water or other liquid may be passed to maintain the tube at the desired temperature. The liquid, depending upon the conditions, may be used either as a cooling means or as a heating means. It is passed through the jacket by means of inlet 13 and outlet 15. A thermometer 17 may be positioned in outlet 15 to record the water temperature and thereby aid in controlling the temperature of the granular material in tube 9. The pressure on the tube may be determined by means of a manometer 19, and the temperature of the gas passing from the tube may be determined by means of thermometer 21. The gas is passed from tube 9 through conduit 23 into a cyclone separator 25. The cyclone separator may, if desired, be provided with a valve 27, or other suitable closure means, whereby any particles of paraformaldehyde caught therein may be removed. The gas passes from the cyclone separator 25 through conduit 29 into water scrubber 31. A series of water scrubbers may be provided, such as water scrubbers 31 and 33. The last water scrubber is preferably provided with a vacuum pump 35 whereby to draw the converter gases through the entire apparatus.

By means of this apparatus, the converter gas causes a constant fluidization and consequent agitation of the particles of paraformaldehyde in the tube 9 whereby formaldehyde in the converter gas is converted into paraformaldehyde on the surface of the paraformaldehyde particles. Any formaldehyde which has not been converted to paraformaldehyde is, in the same operation, converted into aqueous solutions of formaldehyde in the water scrubbers 31, 33, etc.

Referring to Fig. 2 of the drawings, converter gas is passed from the methanol-air converter 5, through a cooler, not shown, if necessary, into a cylinder 57 containing paraformaldehyde in finely divided particle form. The paraformaldehyde particles in the cylinder 57 are agitated by rotating slatted reel or ribbon agitator 59. The reel 59 may be rotated by means of shaft pulley 61. The shaft of the reel is rotatably positioned in bearings in the ends of cylinder 57, as shown. The cylinder 57 is preferably provided with a jacket 63 through which water or other liquid may be passed to maintain the cylinder at the desired temperature. The liquid may be passed through the jacket 63 by means of inlet conduit 65 and outlet conduit 67, the latter preferably being provided with a thermometer 69 and thermometer well 71, as shown. The gas passing from cylinder 57 is passed through cyclone separator 25 and water scrubbers 31, 33, etc., in the same manner as shown in Fig. 1 of the drawings. Here again, the last water scrubber is provided with a pump 35 whereby to draw the liquid through the apparatus.

The paraformaldehyde particles which are used for the absorption of or deposition of additional formaldehyde in the form of paraformaldehyde should be of a fairly finely divided size, for example, particles having a mesh size of $\frac{1}{16}''$ to $\frac{1}{2}''$. The particles may be brought into motion in any desired manner, the two embodiments as above described being illustrative and not limitative of the invention.

Any formaldehyde-containing gas having the following properties may be employed in the direct production of formaldehyde in accordance with the present invention.

(1) The gas must contain sufficient formaldehyde, generally 3% or more, that the partial pressure of the formaldehyde will be above the decomposition pressure of paraformaldehyde at a temperature above the dew-point temperature of the gas. This limits the water content of the gas which determines its dew-point.

(2) The gas should be composed of substantially inert gaseous ingredients, i. e., the gaseous ingredients should have no greater reactivity with formaldehyde at the temperature of operation, about 45° C. to 100° C., than air, carbon dioxide, carbon monoxide, or hydrocarbon vapors which may be contained in the gas.

(3) The gas should contain less than 5% by weight of the formaldehyde of any gas other than water vapor which will form a solid or liquid condensate (e. g., methanol) between room temperature and the temperature of operation.

Formaldehyde is commonly produced by the oxidation of methanol in a catalytic converter. Air is mixed with methanol vapors and the mixture is passed into a converter containing a catalyst to produce a converter gas containing small quantities of formaldehyde. Such converter gas also contains water vapor, oxygen, nitrogen, and small concentrations of methanol, carbon monoxide, and carbon dioxide. By proper control of the formaldehyde process, a gas may be obtained which complies with the above-described specification and is, therefore, suitable for conversion, directly, to paraformaldehyde in accordance with this invention. Formaldehyde-containing gases for use in accordance with this invention may be obtained from sources such as formaldehyde and paraformaldehyde reactions in which the formaldehyde may be recovered in gaseous form. Formaldehyde gas obtained from hydrocarbon reactions may also be used if properly purified so that it will comply with the above-described properties.

The decomposition pressure of paraformaldehyde is the partial pressure of monomeric formaldehyde in equilibrium with paraformaldehyde. On vaporization, paraform decomposes to give monomeric $CH_2O$. If the partial pressure of formaldehyde in a given gas is greater than the decomposition pressure, polymerization will take place at a slow rate until the partial pressure drops to that of the decomposition pressure. A surface of preformed polymer is apparently an admirable acceptor for polymer and exposure of gas to a large polymer surface accelerates the conversion process, which is a surface reaction. The decomposition pressure can be calculated approximately by use of the Lacy equation, which is given below:

$$\log_{10} \text{P}CH_2O = 9.941 - \frac{2905}{T}$$

In this equation $\text{P}CH_2O$ is in mm. Hg, and T is the absolute temperature. Comparison with experimental data indicates that this gives good approximate values up to at least 70° C. For most satisfactory results in the conversion process the partial pressure of formaldehyde in the gas should be at least twice the equilibrium pressure, at a temperature just above the dew-point of the gas. The dew-point is determined by the water content of the gas, and sets the temperature at which the conversion must be carried out. At temperatures below the dew-point, formaldehyde solution would be obtained as a product instead of polymer. A gas containing 5.5% formaldehyde and 7.5% water has a dew-point of approximately 54° C. The partial pressure of formaldehyde in this gas is about four times the decomposition pressure of paraform at 54° C.

A table showing the equilibrium pressure of paraform at various temperatures, as calculated by the Lacy equation and as found by Nordgren (Acta Path. Microbiol. Scand., (Suppl.) 40, 21–30 (1939)), is shown below:

*Decomposition Pressure of Paraform*

| Temp. | Theory Conversion Yield of Paraform | Partial Pressure of $CH_2O$ Over Paraform in mm. | |
|---|---|---|---|
| | | Data of Nordgren | Lacy Equation |
| | Per cent | | |
| 20° C | 98 | 1.2 | 1.1 |
| 30° C | 94 | 2.4 | 2.3 |
| 40° C | 86–9 | 5.4 | 4.3 |
| 50° C | 76–7 | 9.5 | 8.9 |
| 60° C | 58–61 | 15.0 | 16.5 |
| 70° C | 25–44 | 22.0 | 29.6 |

The direct conversion of formaldehyde to paraformaldehyde in accordance with this invention may be accelerated by the use of very small amounts, 0.001% to 0.1%, based on the weight of formaldehyde, of a basic or acidic gas which will not react irreversibly with formaldehyde. For example, hydrogen chloride, sulfur dioxide, and trimethylamine may be used as catalysts for the reaction.

The formaldehyde-containing gas having suitable properties as above described, for example, a methanol converter gas, may be passed into contact with particles of paraformaldehyde by first cooling the gas to a temperature between 70° C. and the dew-point temperature thereof, or, alternatively, this gas may be first purified by removal of water vapor whereby to lower the dew-point temperature of the gas. This water content of the gas may be removed in any desired manner, for example, by fractional condensation in a condensing apparatus, with or without the use of a special condensing agent, for example, hydrocarbon materials or salt solutions.

The paraformaldehyde particles, upon the surface of which the paraformaldehyde is formed by contact with the converter gas, may be maintained at a relatively uniform temperature by means of a liquid or gas. In the case of a small apparatus, it may be necessary to heat the paraformaldehyde particles, whereas, in the case of a large apparatus, it may be necessary to cool the same, since the formation of paraformaldehyde from formaldehyde gas is an exothermic reaction. (Approx. 15 Kcals./gram mole $CH_2O$.)

The following examples are given to illustrate in detail certain preferred embodiments of the procedural steps of the present invention, it being understood that the invention is not to be limited to the details set forth therein.

EXAMPLE I

An apparatus of the type illustrated in Fig. 1 of the drawings was constructed as follows: A jacketed cylinder of approximately 50 mm. diameter of heat-resistant glass tubing approximately 36 inches long was connected as shown with a cyclone separator approximately 16 cm. long having a diameter at the top of approximately 32 mm. and tapering to approximately 15 mm. and four water scrubbers comprising 500 ml. Erlenmeyer flasks. Approximately 300 grams of paraformaldehyde particles of one-quarter inch mesh size were placed in the jacketed cylinder. Approximately 0.3 to 0.36 cubic feet per minute of converter gas containing approximately 5.6% by volume of formaldehyde was passed into the bottom of the jacketed cylinder whereby the paraformaldehyde particles were brought into a state of fluidization in a known manner, i. e., the total mass of the particles of paraformaldehyde were caused to take up approximately 40% greater volume than the mass of the particles at rest in the tube. Such fluidized particles have the appearance of boiling water without noticeable channelling of the gas through the particles and without causing a noticeable blowing of particles from the top of the fluidized mass. Water at a temperature of approximately 54° C. was passed through the jacket 11 as shown in Fig. 1 of the drawings. The gas passing through the cylinder 9 successively passed through the cyclone separator 25 and the four water scrubbers connected in series. After approximately seven hours' operation, the paraformaldehyde particles were removed from the cylinder and weighed. From this it was determined that approximately 20% of the formaldehyde contained in the converter gas which passed through the cylinder was deposited on the paraformaldehyde seed particles to form additional paraformaldehyde. The remainder of the formaldehyde was found dissolved in the water scrubbers as aqueous formaldehyde solutions.

EXAMPLE II

A process similar to that described in regard to Example I was carried out in an apparatus of the type illustrated in Fig. 2 of the drawings with approximately 400 grams of paraformaldehyde particles of one-quarter inch mesh size in the cylinder 57. Water at a temperature of about 54° C. was passed through jacket 63, and approximately 0.3 to 0.36 cubic feet per minute of converter gas containing approximately 5.6% by volume of formaldehyde was passed through cylinder 57. After operating over a period of approximately six hours, it was found that about 50% of the formaldehyde in the converter gas was converted to paraformaldehyde on the paraformaldehyde seed particles. The remainder of the formaldehyde in the gas was converted to aqueous solutions of formaldehyde in the water scrubbers.

The process of the present invention has the advantage that it may be employed in a system in which formaldehyde converter gas is absorbed in water scrubbers in the conventional manner to produce, simultaneously with the production of aqueous solutions of formaldehyde, a simultaneous yield of paraformaldehyde particles. The process of this invention may, of course, be made continuous by providing the apparatus in which the paraformaldehyde particles are agitated with means for moving paraformaldehyde particles gradually therethrough.

Throughout the specification and claims, any reference to parts, proportions, and percentages, refers to parts, proportions, and percentages by weight unless otherwise specified.

Since it is obvious that many changes and modications can be made in the above-described details without departing from the nature and spirit of the invention, it is to be understood that the invention is not to be limited to said details except as set forth in the appended claims.

What is claimed is:

1. The process of producing paraformaldehyde which comprises passing a formaldehyde-containing gas into contact with paraformaldehyde particles at a temperature above the dew-point temperature of the gas but below the temperature at which the partial pressure of the formaldehyde in the gas equals the decomposition pressure of paraformaldehyde, said gas consisting essentially of formaldehyde, water vapor and gaseous substantially inert material, the latter containing less than about 5% by weight of the formaldehyde of gas that is condensable between room temperature and the temperature of operation, and containing sufficient formaldehyde that the partial pressure of the formaldehyde will be above the decomposition pressure of paraformaldehyde at a temperature above the dew-point temperature of the gas.

2. The process of producing paraformaldehyde which comprises passing a formaldehyde-containing gas into contact with paraformaldehyde particles at a temperature above the dew-point temperature of the gas but below the temperature at which the partial pressure of the formaldehyde in the gas is twice the decomposition pressure of paraformaldehyde, said gas consisting essentially of formaldehyde, water vapor and gaseous substantially inert material, the latter containing less than about 5% by weight of the formaldehyde of gas that is condensable between room temperature and the temperature of operation, and containing sufficient formaldehyde that the partial pressure of the formaldehyde will be above the decomposition pressure of paraformaldehyde at a temperature above the dew-point temperature of the gas.

JOSEPH FREDERIC WALKER.

REFERENCES CITED

The following references are of record in the file of this patent:

UNITED STATES PATENTS

| Number | Name | Date |
|---|---|---|
| 2,125,375 | Hinegardener | Aug. 2, 1938 |